(12) United States Patent
Washington

(10) Patent No.: US 10,889,239 B2
(45) Date of Patent: Jan. 12, 2021

(54) LIGHTING APPARATUS

(71) Applicant: Full Moon Lighting LLC, Edgewater, MD (US)

(72) Inventor: Devon Washington, Edgewater, MD (US)

( * ) Notice: Subject to any disclaimer, the term of this patent is extended or adjusted under 35 U.S.C. 154(b) by 0 days.

(21) Appl. No.: 16/240,160

(22) Filed: Jan. 4, 2019

(65) Prior Publication Data

US 2019/0217770 A1    Jul. 18, 2019

Related U.S. Application Data

(60) Provisional application No. 62/618,441, filed on Jan. 17, 2018.

(51) Int. Cl.
*B60Q 1/30* (2006.01)
*B60Q 1/00* (2006.01)
*B60Q 1/22* (2006.01)

(52) U.S. Cl.
CPC .......... *B60Q 1/305* (2013.01); *B60Q 1/0088* (2013.01); *B60Q 1/22* (2013.01)

(58) Field of Classification Search
CPC ........ B60Q 1/305; B60Q 1/0088; B60Q 1/22; B60Q 1/24; B60P 3/06; B60P 3/103; B60P 3/105
See application file for complete search history.

(56) References Cited

U.S. PATENT DOCUMENTS

| | | | | |
|---|---|---|---|---|
| 3,418,628 A * | 12/1968 | Fenner | ...................... | G08B 5/36 340/431 |
| 3,512,288 A * | 5/1970 | Hall | ........................ | E01F 9/662 40/590 |
| 3,887,093 A * | 6/1975 | Howell | .................. | B60P 3/1075 414/532 |
| 4,598,339 A * | 7/1986 | Ainsworth | ............... | B62J 6/001 116/28 R |
| 4,715,768 A * | 12/1987 | Capps | .................... | B60P 3/1075 280/414.1 |
| 6,273,448 B1 * | 8/2001 | Cross | ........................ | B60D 1/36 280/477 |
| 6,302,567 B1 * | 10/2001 | Gamble, Sr. | ......... | B60Q 1/2657 340/431 |
| 6,886,968 B1 * | 5/2005 | Hamelink | ................ | B60D 1/58 280/163 |
| 6,916,109 B2 * | 7/2005 | Julicher | .................... | B60D 1/36 280/477 |
| 7,001,052 B2 * | 2/2006 | Cullinan | ................... | B60P 3/10 362/485 |
| 7,108,408 B2 * | 9/2006 | Tinklenberg | ........... | B60Q 1/305 362/418 |

(Continued)

*Primary Examiner* — Erin Kryukova
(74) *Attorney, Agent, or Firm* — Laubscher & Laubscher, P.C.

(57) ABSTRACT

A lighting apparatus for connection with a trailer includes an elongated housing having an upper end and a lower end adapted for connection with a post, and at least one sidewall. A mounting assembly is connected with an upper portion of the elongated housing and a light is connected with the mounting assembly. The housing has an inner chamber for receiving a wire harness and/or power source for the light. When the elongated housing is connected with a trailer frame, the light faces a rear direction relative to the trailer and is operable to illuminate the area rear of the trailer.

9 Claims, 2 Drawing Sheets

(56) References Cited

U.S. PATENT DOCUMENTS

| | | | | |
|---|---|---|---|---|
| 7,434,971 B1* | 10/2008 | Wang | ............... | B60Q 1/2657 |
| | | | | 362/249.01 |
| 7,780,323 B2* | 8/2010 | Nolle | ............... | B60P 3/18 |
| | | | | 280/477 |
| 9,649,899 B1* | 5/2017 | Berry | ............... | B60D 1/36 |
| 2003/0128105 A1* | 7/2003 | Shaw | ............... | B60Q 1/22 |
| | | | | 340/431 |
| 2004/0156205 A1* | 8/2004 | Pisciotti | ............... | B60Q 1/305 |
| | | | | 362/485 |
| 2004/0211351 A1* | 10/2004 | Emerson | ............... | B60D 1/36 |
| | | | | 116/28 R |
| 2005/0194761 A1* | 9/2005 | Givens | ............... | B60D 1/36 |
| | | | | 280/477 |
| 2005/0263982 A1* | 12/2005 | Mickley | ............... | B60P 3/1075 |
| | | | | 280/414.1 |
| 2006/0001529 A1* | 1/2006 | Young | ............... | B60D 1/62 |
| | | | | 340/431 |
| 2006/0120093 A1* | 6/2006 | Purdy | ............... | B60Q 1/2657 |
| | | | | 362/485 |
| 2009/0194969 A1* | 8/2009 | Bearey | ............... | B60D 1/36 |
| | | | | 280/477 |
| 2016/0090028 A1* | 3/2016 | Krejci | ............... | B60Q 1/305 |
| | | | | 362/485 |
| 2016/0243978 A1* | 8/2016 | Speropoulos | ............... | B60Q 1/2661 |
| 2018/0037076 A1* | 2/2018 | Jarrett | ............... | B60P 3/06 |

* cited by examiner

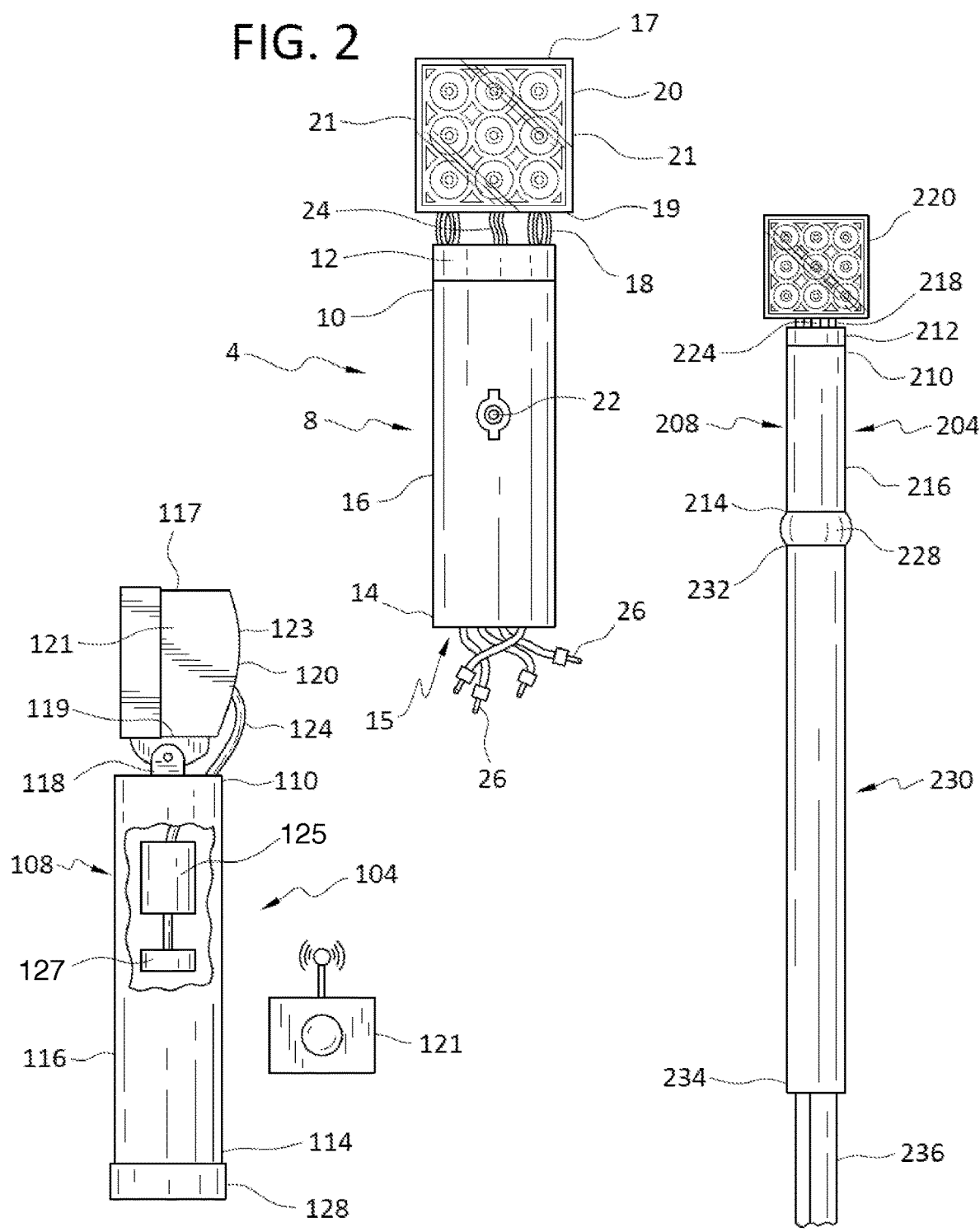

US 10,889,239 B2

LIGHTING APPARATUS

This application claims priority of U.S. provisional application No. 62/618,441 filed on Jan. 17, 2018.

BACKGROUND OF THE DISCLOSURE

The present disclosure relates to a lighting apparatus for connection with a trailer.

Detachable trailers are used for all types of purposes. They could be used to haul a boat, garbage, equipment, household items, or for other similar purposes. Typically, such trailers attach to a trailer hitch located at the rear of an automobile and are pulled by the force of the automobile. These trailers usually need to be road authorized, including having rear lights to signal when they are stopping and/or turning.

When hauling an item with a trailer, once the destination is reached, the driver will often back the trailer into a parking spot to provide for easier unloading of the item. This can be challenging though. Maneuvering an automobile in reverse with a trailer attached takes additional driving skills and experience. For some, mastering this skill can be difficult. It is even more difficult when attempting to maneuver a trailer in low-light environments.

Many trips that include hauling a trailer take place in the early or late hours of a day. For instance, when taking a boat out for a fishing trip, the boat is usually launched at or before dawn to take advantage of prime fishing time. Alternatively, for the more recreational boater, time on the water in a boat can often last until dusk or later. In these instances, the early morning or late day makes the already difficult task of reversing a trailer into its unloading location more challenging. Not only are the skills associated with maneuvering the trailer challenging, they are done without the driver being able to fully see the unloading location.

When handling a trailer in such low-light environments, a driver might rely on the red brake lights at the back of the trailer to illuminate a portion of the area around the trailer. Those lights, however, do not normally provide sufficient lighting. To combat this, a passenger could stand outside of the vehicle and shine a flashlight toward the area of which the trailer is reversing, or if alone, a driver could place a portable spotlight on the trailer, boat, or items stored on the trailer, to illuminate the area around the trailer. Those strategies, however, are not ideal and can be ineffective. Further, if the spotlight requires connection with a power source, the driver needs to spend time connecting the light to his or her vehicle prior to using it. Therefore, there is a need for a device that would provide a better means of illumination to the rear of a trailer during operation.

SUMMARY OF THE DISCLOSURE

Accordingly, it is an object of the present disclosure to provide a lighting apparatus that is connected with a portion of a trailer frame and used to illuminate the area behind the trailer while the trailer is being reversed to an unloading and/or loading location. In a preferred embodiment, the apparatus includes an elongated housing adapted for connection with a guide post on the trailer, a mounting assembly connected with an upper portion of the housing, and a light connected with the mounting assembly. The housing has an inner chamber for receiving a wire harness and/or power source for the light. When the elongated housing is connected with a trailer frame guide post, the light faces a rear direction relative to the trailer and is operable to illuminate the area rear of the trailer. Preferably, there is a connector that is a coupler or mounting device attached with the elongated housing's lower end and adapted for connection with the upper end of the post. The lower end of the housing will fit snugly over the upper end of the post. The lighting apparatus is controlled by a switch which extends through an opening in the housing and is connected with the wire harness, as well as a remote controller for wireless control of the light. Alternatively, the light could be automatically engaged when an automobile that is hauling the trailer is put in reverse gear.

In a second embodiment, the housing upper end contains an opening and the light includes a wire harness connected with the housing upper end opening for connection with a power source. In a further embodiment, the harness is connected with a power source which is arranged within the housing inner chamber.

In yet another embodiment, the housing lower end contains an opening through which the wire harness can extend for connection with a remote power source, for instance, an automobile battery.

BRIEF DESCRIPTION OF THE FIGURES

Other objects and advantages of the disclosure will become apparent from a study of the following specification when viewed in the light of the accompanying drawing, in which:

FIG. 2 is a front view of one embodiment of the lighting apparatus herein;

FIG. 3 is a side view of a second embodiment of the lighting apparatus herein;

FIG. 4 is a front view of a third embodiment of the lighting apparatus herein.

DETAILED DESCRIPTION

Figure 1:
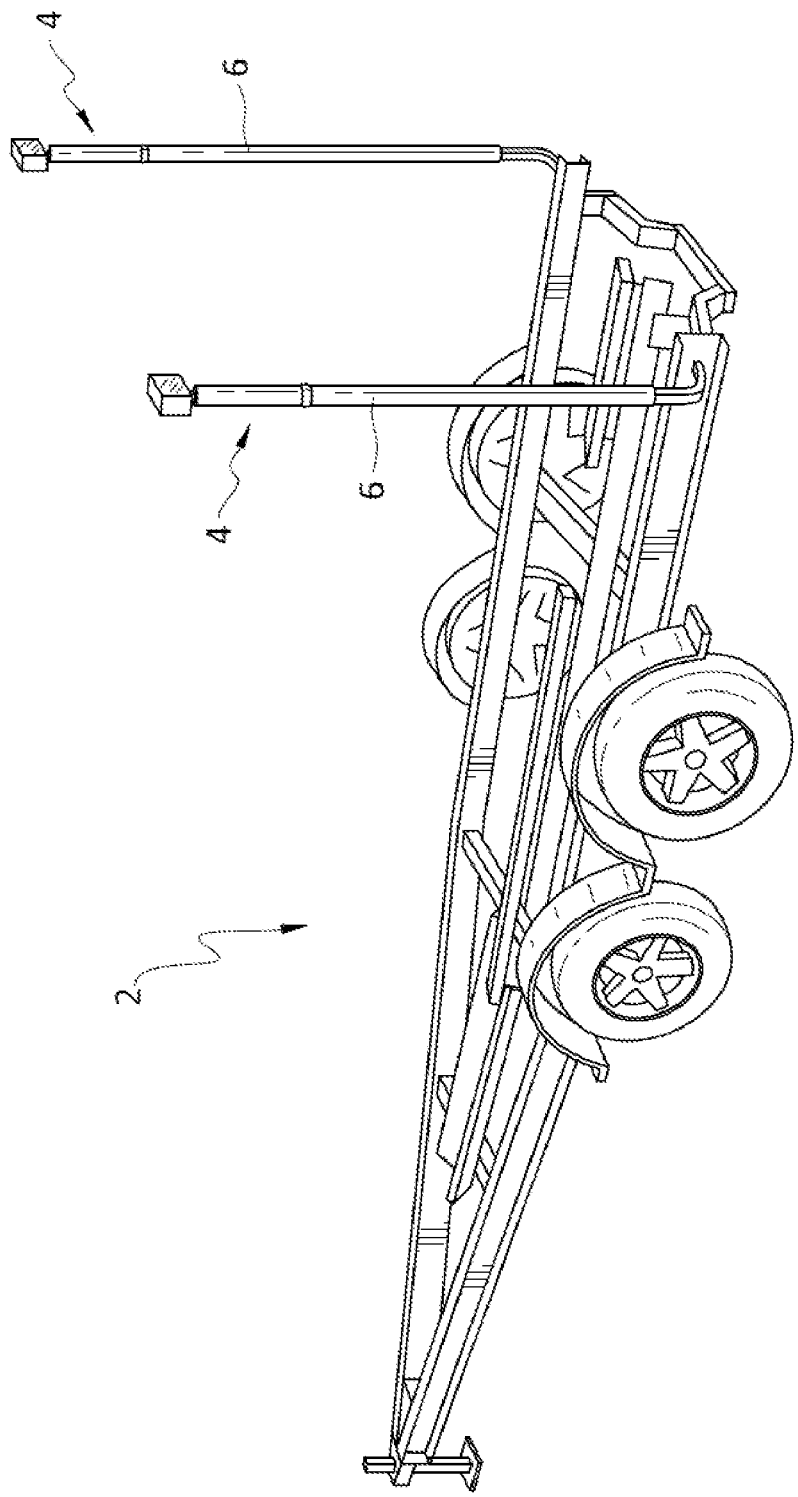
FIG. 1 is a perspective view of a boat trailer with a lighting apparatus attached thereto.

Referring to FIG. 1, there is shown a boat trailer 2 having two lighting apparatuses 4 each connected to a guide post 6 that extends vertically from a side of the trailer. The lighting apparatuses face the area rear of the trailer to illuminate the surrounding area. Typically, when a trailer is moved in reverse, for example when a trailer is backed onto a boat ramp, and there is little-to-no light around the area behind the trailer, the person reversing the trailer has difficulty seeing exactly where to go and how to maneuver the trailer. The lighting apparatuses 4 attached to the post provide light in such instances to assist a driver with maneuvering the trailer.

Each lighting apparatus shown in FIG. 1 is attached to a polyvinyl chloride (PVC) guidepost 6. Such posts are often found on boat trailers and are used as guides for the boat when being loaded on and off the trailer. The length of such guideposts is usually dependent on the size of the boat, but typically range from 40-60 inches. The lighting apparatuses 4 are connected with the posts 6. However, in a separate embodiment, the apparatuses attachable with the posts via a press or snap fit, threaded lower end, mounting assembly, or other manner and can then be used to illuminate the area around the trailer. The lighting apparatuses could be retrofit and attached with a post, or a post with the lighting apparatus could be manufactured as a single unit.

Referring now to FIG. 2, the lighting apparatus 4 is shown in its detached state when not connected with a guide or other post. The apparatus includes an elongated housing 8 having an upper end 10 with a top cap 12, a lower end 14 containing an opening 15 through which a wire harness 26 extends, and at least one sidewall 16. The housing 8 has an inner chamber for receiving power from a power source. A mounting assembly 18 is connected with the top cap 12, and a light 20 having a top wall 17, bottom wall 19, side walls 21, and a rear wall is connected with the mounting assembly. Preferably, the light is a light-emitting diode (LED). As shown in FIG. 1, when the elongated housing is connected with an upper end of a post, the light faces a rear direction relative to the trailer and is operated to illuminate the area rear of the trailer.

Further to the embodiment of FIG. 2, there is a light switch 22 connected with a wire harness 24 that is connected with the light 20 to operate the light. The light switch 22 is also connected with a second wire harness 26 for connection with a remote power source, for instance, an automobile battery. It will be understood by those with skill in the art that, rather than a light switch, the light could be operable via a wireless remote controller and transponder, and, rather than a remote power source, the wire harness could connect with a battery retained within the inner chamber of the elongated housing 8. Further, a single wire harness, or additional wire harnesses, could be included to connect the light with the power source.

FIG. 3 shows a second embodiment of the lighting apparatus 104, which also has an elongated housing 108 having an inner chamber, an upper end 110, a lower end 114, and at least one sidewall 116. A mounting assembly 118 is connected with the upper end 110 of the elongated housing 108, and a light 120 having a top wall 117, bottom wall 119, side walls 121, and rear wall 123 is connected with the mounting assembly. The embodiment of FIG. 3 further includes a connector 128 and a wire harness 124. The connector is arranged at the lower end 114 and is adapted for connection with a post. A transponder 125 and battery 127 are retained within the elongated housing 108. The transponder is wirelessly connected with a remote controller 121 and is connected with the light 118 via the wire harness 124. The elongated housing lower end 114 is closed for securing the battery and transponder but can be opened to access the battery for replacement or charging.

In the embodiment of FIG. 4, the lighting apparatus 204 includes many of the elements of FIGS. 2 and 3 but also includes a post 230 for connection with a portion of a trailer frame 236. The post has an upper end 232 connected with the lower end 214 of the elongated housing 208 via a connector 228 and a lower end 234 adapted for connection with a trailer frame 236. The upper and lower ends have openings and the post has an inner chamber. The lower end 234 has an inner surface diameter that is wide enough to fit over a portion of the trailer frame 236 for connection with the frame. To provide power to the light 220, the top cap 224 has an opening through which the wire harness 224 of the light extends. The wire harness travels through the inner chamber of the elongated housing 208 and passes through the inner chamber of the post 230 and through the lower end opening 234 of the post to an opening in the frame 236 which connects with a trailer harness and ultimately to a power source, preferably an automobile battery. The light can then be operated selectively as needed, or, alternatively, it can be automatically engaged when the automobile that is hauling the trailer is in reverse gear.

Referring to FIGS. 3 and 4, the connectors 128 and 228 are couplers that have an inner diameter sufficiently similar to the outer diameter of a post. Each coupler is retained via a press-fit, threaded inner wall, nut and bolt, or any other manner for securing it to the post outer wall. In separate embodiments, the connector is another device, for instance, a mounting assembly connected to the lower end of the elongated housing 108 and 208 and adapted for connection with a post upper end.

The elongated housing of the embodiments of FIGS. 1-4 and the post shown in FIGS. 1 and 4 have a cylindrical configuration. It will be understood by those with skill in the art that other configurations of the elongated housing and/or post could be provided without affecting the purpose or scope of the detachable lighting devices disclosed herein.

In separate embodiments, similar to that of FIG. 4, the post may or may not have openings at the upper and lower ends. The upper end of the post may not need to have an opening if the wire harness is connected with a power source that is retained within the elongated housing inner chamber. Further, the lower end of the post may not need an opening if it connects with the trailer frame via a mounting assembly or other device.

Further, in another embodiment, the light extends the length of the apparatus housing or the length of the housing and post combined.

Although the above description with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A lighting apparatus for connection with a boat trailer comprising:
   (a) an elongated housing having an upper end and a lower end containing an opening adapted for connection with an upper end of a boat trailer guidepost;
   (b) a mounting assembly connected with an upper portion of said elongated housing;
   (c) a light having a back wall and at least one side wall for unidirectional illumination, said light being connected with said mounting assembly; and
   (d) a mechanism for connecting said light with a power source, whereby when said elongated housing is connected with the upper end of the boat trailer guidepost, said light illuminates the area behind the boat trailer.

2. A lighting apparatus as defined in claim 1, further comprising a connector arranged at said elongated housing lower end.

3. A lighting apparatus as defined in claim 2, wherein said connector is one of a coupler and mounting device attached to said elongated housing lower end and adapted for connection with the boat trailer guidepost upper end.

4. A lighting apparatus as defined in claim 1, wherein said mechanism includes a wire harness extending through said elongated housing lower end opening and configured for connection with the power source.

5. A lighting apparatus as defined in claim 4, and further comprising a light switch arranged on said elongated housing for operation of said light.

6. A lighting apparatus as defined in claim 1, wherein said mechanism includes a wire harness extending through said upper end and configured for connection with a power source.

7. A lighting apparatus as defined in claim 6, wherein said power source is a battery.

8. A lighting apparatus as defined in claim 1, wherein said elongated housing has a generally cylindrical configuration.

9. A lighting apparatus as defined in claim 1, further comprising a remote controller for wirelessly controlling the operation of said light.

\* \* \* \* \*